United States Patent [19]

Pinede et al.

[11] 4,064,373
[45] Dec. 20, 1977

[54] LINE CIRCUIT FOR KEY TELEPHONE SYSTEMS

[75] Inventors: Edouard Pinede, Norwalk, Conn.; John Fraser Litser, Guelph, Canada

[73] Assignee: International Standard Electric Corporation, New York, N.Y.

[21] Appl. No.: 627,935

[22] Filed: Nov. 3, 1975

Related U.S. Application Data

[63] Continuation of Ser. No. 456,055, March 29, 1974, abandoned.

[30] Foreign Application Priority Data

July 9, 1973 Canada .................................. 175971

[51] Int. Cl.² ............................................. H04M 1/00
[52] U.S. Cl. .................................. 179/99; 179/18 FA
[58] Field of Search ..................... 179/99, 84 R, 84 T, 179/18 HB, 18 F, 18 FA

[56] References Cited

U.S. PATENT DOCUMENTS

| | | | |
|---|---|---|---|
| 3,748,401 | 7/1973 | Pesz | 179/84 R |
| 3,748,403 | 7/1973 | Schartmann et al. | 179/99 |
| 3,748,404 | 7/1973 | Davis | 179/99 |
| 3,748,405 | 7/1973 | Saba | 179/99 |
| 3,816,670 | 6/1974 | Marshall | 179/99 |

Primary Examiner—Kathleen H. Claffy
Assistant Examiner—Gerald L. Brigance
Attorney, Agent, or Firm—J. B. Raden; M. M. Chaban

[57] ABSTRACT

A line circuit for providing line control between a central office or PBX line and the key telephone station subscriber instruments. The line circuit responds to ring currents to activate suitable signalling at stations having access to the called line. The circuit responds to a station going off-hook following ringing to provide the well-known responses. Call holding is also controlled by the line circuit. Within the circuit, the ring response is activated by a capacitor, the same capacitor being used to time out and terminate ring on a failure to respond and also to time the release of the circuit from the central office line.

3 Claims, 1 Drawing Figure

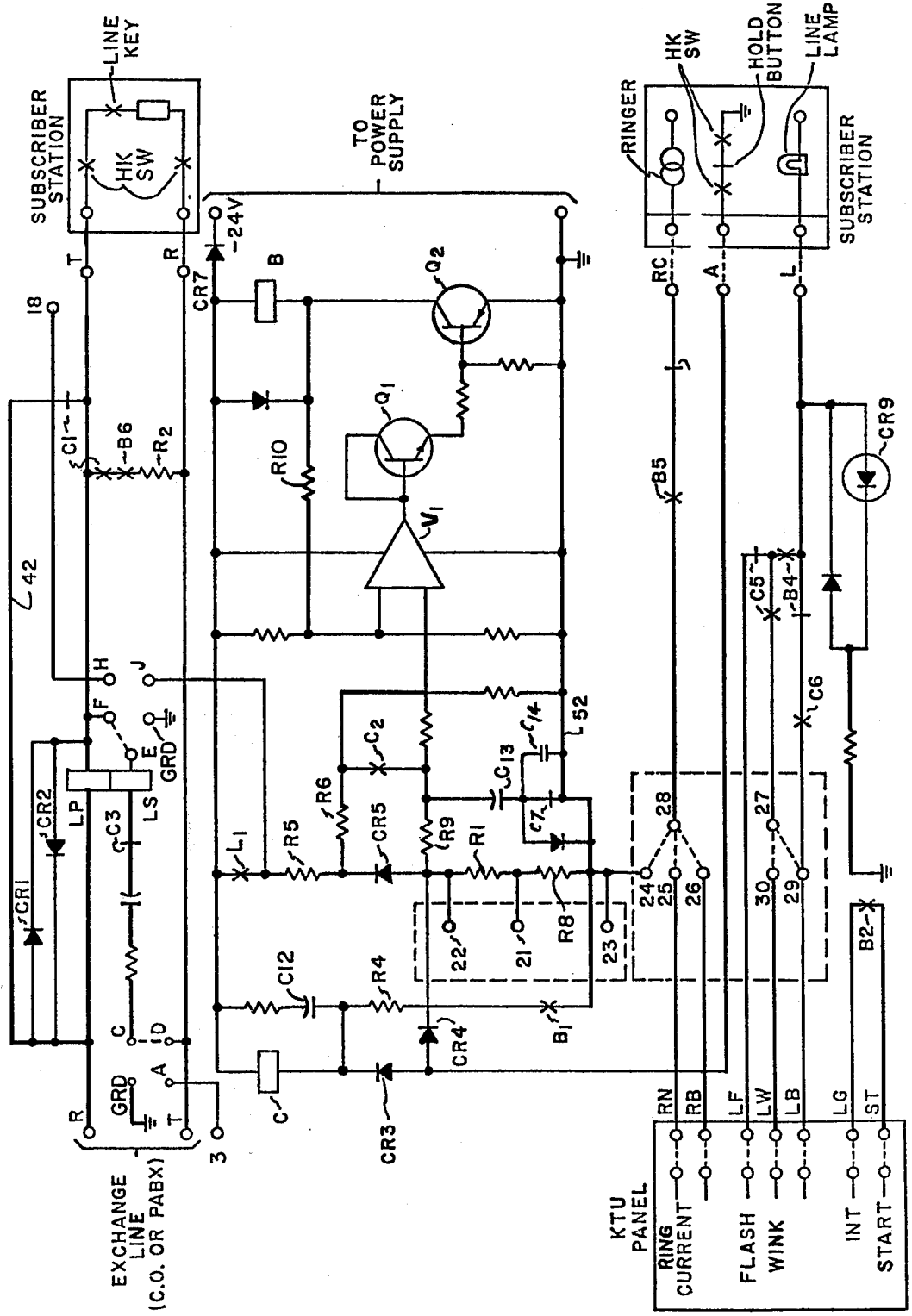

LINE CIRCUIT FOR KEY TELEPHONE SYSTEMS

This is a continuation, of application Ser. No. 456,055 filed Mar. 29, 1974, now abondoned.

BACKGROUND OF THE INVENTION

Line circuits for key systems are well-known. The progression and advance may be seen from the essentially electromagnetic circuits shown in U.S. Pat. No. 3,239,610 issued Mar. 8, 1966 to Morse and the later more transistorized versions shown in U.S. Pat. No. 3,436,488 issued Apr. 1, 1969 to Barbato et al. A later version is shown by the more recent U.S. Pat. No. 3,676,608 issued July 11, 1971 to Goldthorp et al.

SUMMARY OF THE INVENTION

The present invention comprises an improvement over the aforementioned patents in that it employs only three relays but employs its relays, solid state components and other circuit elements to perform its functions in a manner not shown by any of the noted reference patents.

In the present invention, the conventional two winding relays is provided in and across the two speech path conductors and in series with one of these conductors. One winding of this relay is normally shunted out of the ringing path to avoid response of this winding to ringing currents. The second winding responds to the ringing current and follows the currents by closing and opening on each burst of ring current.

A timing capacitor is charged by these bursts to operate the ring control relay. The same capacitor is used to time the duration of unanswered ringing following hang-up of the originating station to terminate the ringing. The same capacitor together with a second capacitor is used in the hold condition to time and cause the release of the line following an intentional interruption of the exchange or central office line.

It is therefore an object of the invention to provide a new and improved line circuit for key systems.

It is a further object of the invention to provide a key system capable of being constructed using integrated circuit components mounted on a single printed circuit board.

It is a still further object of the invention to provide a line circuit for key systems which employs a normally functioning shunt path across one winding of the line relay, the shunt being effective during ringing, but being inactivated responsive to the called line station going off-hook, the shunt path also providing a metallic talk path in the event of power failure.

It is a still further object of the invention to provide a line circuit for key systems in which one capacitor is used to produce a number of different timing functions for use by the line circuit.

It is still a further object of the invention to provide a visual indication of each step in the progress of a call for ease of maintenance.

BRIEF DESCRIPTION OF THE DRAWING

FIG. 1 is a schematic diagram of a line circuit employing our inventions.

DETAILED DESCRIPTION OF THE DRAWING

First of all, the options available by strapping will be explained these being indicated by the terminals ABCD and Ground, EFHJ and Ground and 23–30. Shown in dashed form are the normal connections made between these terminals for bridged ringing detection, i.e., C to D strapped and E to F strapped. Where ringing on the tip (T) lead is to be received from the line, terminal C is strapped to terminal D, and E is strapped to ground terminal. For ringing over the ring (R) lead, the ground terminal is strapped to C and E is strapped to F. When ringing is supplied on leads separate from the T and R leads, terminal A is strapped to C, E to H and the ringing voltage is applied to terminals 3 and 18. For separate ring detection using a relay contact closed by the ring, terminal H is strapped to terminal J. On ring detection with this strapping, the relay contact closes to apply −24V to terminal 18.

For providing different signalling outputs, straps 23–30 are provided. If grounded ringing is to be used, terminal 24 is strapped to terminal 28. For interrupted ringing, terminals 25 and 28 are strapped. For steady ringing, terminal 26 is strapped to terminal 28. To provide a steady lamp condition in the hold condition, terminal 27 is strapped to terminal 29, and for lamp winking, terminal 27 is strapped to terminal 30. The usual condition employing interrupted ring and lamp winking will be described herein.

The circuit of FIG. 1 is shown in the idle condition. In the idle condition, all three relays are deenergized. Integrated circuit U1 which is shown as an operational amplifier has its output in the off condition with its output terminal at about −2 volts. Transistors Q1 and Q2 are in the off condition. Transistor Q1 functions as a zener diode in that it regulates the voltage to the base of transistor Q2 keeping this transistor in the off condition when the output of amplifier U1 is at its quiescent or −2 volts state. The light emitting diode indicated as CR9 is not illuminated providing a visual indication that the line card is not in use.

Assuming bridged ringing with straps between terminals C and D, and between E and F; ringing current from the line will flow from the exchange over the R lead through the shunt path over lead 42 through strap E and F, the secondary (LS) winding of relay L, closed contacts C3, capacitor C11 and strap C–D to the T lead and back over the exchange line. The ring current causes the energization of the L relay over the LS winding on each half cycle of ringing current.

Relay L has one set of contacts L1 within the d.c. portion of the line circuit. These make contact L1 close on each half-cycle of ringing current to cause capacitor C13 to begin charging via resistor R5, diode CR5, resistor R9 and break contact C2. After a sufficient number of ringing cycles (approximately 250 msec), capacitor C13 is sufficiently charged to cause integrated circuit amplifier U1 to conduct and produce an output of approximately 22 volts at its output. This delay prevents the line circuit from responding to spurious high voltages induced on the line.

Integrated circuit amplifier U1 on operation overcomes the zener voltage of Q1 base emitter, and forward biases transistor Q2 to energize relay B. In addition, a positive feedback from the collector of transistor Q2 by way of resistor R10 modifies the bias of amplifier U1 to lock amplifier U1 in its operative state in case the silent period of the ringing cycle occurs at this time.

Relay B operates and functions as follows:
a. Closes make-contacts B1. Relay C does not energize at this time as Resistor R4 limits the current to less then that required to energize the relay.
b. Closes its make contacts B2 to start the interrupter in the KTU panel.

c. Switch over contacts B4 to supply lamp flash (LF) interrupted input of the line lamp at the subscribers' telephone sets via closed contacts C5, make contacts B4, and terminal L or L lead. The LF input also causes lamp CR9 to flash at the flash rate, indicating the line card is in use.

d. Closes its make contacts B5 to apply the ringing voltage from the KTU panel over lead RN to the ringer or audible signaller at the subscribers' telephone sets over a path through break contacts C4 and terminal RC.

e. Closes make contacts B6. Does not perform any function at this time as make contacts C1 are open.

Thus, with ringing current being received over the exchange CO line, relay L energizes on each half-cycle of ringing current, relay B has been energized. Relay C is de-energized. Amplifier U1, and transistors Q1 and Q2 are operated. Ringing voltage and lamp flashing voltage are applied to the subscribers' telephone sets, and light emitting diode CR9 will be lit and flahsing. The circuit remains in this condition until the call is either answered or abandoned and times out (as will be described).

When the subscriber answers, he either has the telephone off-hook and presses the line button or he has the line button depressed and subsequently goes off-hook. Contact sequencing in the telephone instrument is such that the A lead closes to ground before the T and R leads close to form a loop. Also, when the subscriber answers, ground potential from the telephone set is applied over the hook switch and line key (and the A lead) and forward-bias diodes CR3 and CR4 to close the C relay winding to −24V through CR7. This ground through diode CR4 causes capacitor C13 to discharge rapidly and switch the operational amplifier U1, shutting off transistors Q1 and Q2 to deenergize the B relay.

The C relay operates over this path and actuates its contacts as follows:

a. Break-make contacts C1 change condition. The break contact set opens to open the shunt path 42 around the LP winding of the L relay allowing the L relay to operate. Oppositely disposed diodes CR1 and CR2 are now in parallel with the LP winding one of which provides a low impedance A.C. path for audio signals. Make contacts C1 close to perpare the circuit for possible hold conditions in series with B relay contacts B6.

b. Make contacts C2 close. These contacts are necessary to the hold condition and perform no present function. Break contacts C11 open connecting copocitor C14 in series with capacitor C13.

c. Break contacts C3 open to disable the ring detect function of the LS winding of the L relay by opening the operating path to this winding.

d. Break contacts C4 open to terminate the transmission of ringing pulses from the unit to the subscriber set. Thus, this contact set (C4) perform the ring trip function.

e. Break-make contacts C5 operate. The break set opens the lamp flash path to the subscriber set and transfers over its make set to apply a steady current source to light the station line lamp steadily. Diode CR9 also is illuminated steadily over these contacts.

The ground potential on the A lead from the telephone set forward-biases diode CR4, applying approximately ground potential to the junction of diode CR4 and resistor R9. This ground potential causes integrated circuit amplifier U1 to be switched off and maintained inoperative. Transistor Q1 is cut off as is transistor Q2 and B is de-energized.

The subscribers' telephone set is now connected to the exchange line via the line circuit and the call may be completed. Relays L and C are energized, relay B is de-energized, transistor Q2 remains cut off, and lamp diode CR9 is on steadily. No function is performed by the L relay closure at this time.

When the call is complete and the subscriber goes on-hook terminating the call; the ground potential is removed from the A lead by opening of either the hook switch or line key and the line loop to the exchange is opened. Relays L and C are de-energized by the open A lead and open R-T loop and the circuit returns to the idle condition.

If the call to the subscriber had not been answered and the call was abandoned by the exchange, relay L restores on the open circuit at the exchange, opening contacts L1. Capacitor C13 discharges slowly over a path via resistors R9, R7 and R8, approximately 30 seconds after receiving the last ringing cycle. When capacitor C13 has discharged sufficiently, amplifier U will be shut off to cause relay B to restore.

A shorter time-out may be obtained by inserting strap 21-22 and adding an appropriate resistor between terminals 21 and 23 thereby shunting resistor R8. The time-out desired, as a fraction of the original time-out, can be obtained by using an appropriate resistor. When the duration of the ringing portion of the ring cycle is one second, the time-out will not be reduced below 50 percent of the original time-out.

To initiate an outgoing call, the subscriber goes off-hook closing his hookswitch and presses the line key; ground potential is applied to the lead over these closed contacts and the T-R loop to the exchange is also completed over the T and R leads.

The ground potential on the A lead forward-biases diode CR3 to energize the relay C over the previously described path. Diode CR4 is also forward biased keeping amplifier U1 inoperative and relay B deenergized. Relay C on being energized:

a. Operates contacts C1. Break-contacts C1 open and relay L is energized over its LP winding. Make-contacts C1 close (required when a line is put on "hole" does not perform any function at this time).

b. Closes make contacts C2 and opens break contact C2. Required when a line is put on "hold," and does not perform any function at this time.

c. Opens break contacts C4, ensuring the ringing path to the subscribers' telephone sets remains open.

d. Applies a steady lamp voltage (LB) to the subscribers' telephones via lead LB, make contacts C6, break contacts B4 and the lead causing the appropriate line lamp on the telephone set to be lit steadily. The LB input also causes diode CR9 to be on steadily, indicating the line card is "busy."

The subscribers' telephone set is now connected to the exchange line via the line card and the subscriber may dial the required number. Dial pulsing is applied to the exchange line by way of the line circit T and R leads. When the called party answers, the call is completed. Thus, when an outgoing call is in progress, relays L and C are energized, relay B is de-energized, transistors Q1 and Q2 are cut off, and lamp diode CR9 is iit steadily.

When the call is complete and the subscriber goes on-hook, the circuitry reverts to the idle condition, in the manner previously described.

When a subscriber wishes to put an established call on hold, the condition of the system due to the established call is as follows: Relays C and L are energized, relay B is de-energized, transistor Q2 is cut off, diode CR9 is on steadily, and the LB lead input is applied to the line lamp at the subscriber telephone sets connected to the L lead.

The subscriber presses the "hold" button at his telephone set, ground potential is removed from the A lead. As the T-R path to the telephone set is still complete (or looped) and relay L is still energized, make contacts L1 are closed to apply a negative potential to amplifier U1 via resistors R5 and R6.

Amplifier U1 operates, and causes transistor Q2 to conduct and relay B is energized. Relay B on energization:

a. Closes make contacts B1 providing a holding path to keep relay C energized. This path may be tracted from the −24 volt source through the C relay, resistor R4 contacts B1 to the common ground lead 52.
b. Closes make contacts B2 to start the interrupter at the KTU panel.
c. Closes make contacts B4 applying a lamp wink voltage to the subscribers' telephone sets through closed make contacts C5 to the LF terminal at the KTU panel.
d. Closes make contacts B6 which combined with closed contacts C1 to provide a holding bridge for the exchange line.

Thus for hold, the B, C and L relays are operated, and amplifier U1 is conductive as are transistors Q1 and Q2.

When the subscriber releases the "hold" button, the telephone set pickup button or line key is also released, disconnecting the telephone set from the line circuit. The speech path for the exchange line is maintained from the exchange line R terminal through the primary winding (LP) of relay L, make contacts B6, resistor R2, and terminal T to the line. The exchange line remains held until the subscriber reconnects to the line or the line is released by the exchange, as will now be described.

Should the exchange line current be interrupted, relay L restores and its make contacts L1 open. Capacitors C13 and C12 in series start to discharge. If the line current interruption is less than 10 msec. in duration, capacitors C13 and C12 are recharged via resistor R6 and closed contacts C2. The voltage input to amplifier U1 is not appreciably charged and the amplifier maintains relay B operated. If the line interruption is greater than 50 milliseconds, capacitor C13 discharges sufficiently to make U1 inoperative, Q2 is cut off causing relay B to deenergize. Relay B opens its contacts B1 in the relay hold path. Relay C releases and the circuit returns to the idle condition.

In some prior art systems, which did not contain means for providing this last mentioned timing control, transient spikes of short duration frequently caused inadvertent release of the held station. By using the present line circuit, an open condition of longer than 50 milliseconds is required to cause the line circuit to release. Thus, a line circuit can be released at the exchange in a manner protecting against inadvertent release due to transient spikes of shorter duration than 10 milliseconds.

In this way, we have provided a three relay line circuit in which relays L and B are operative in response to ring current, relay C is operative responsive to the line loop condition, and relays L, B and C respond to provide the hold feature. Timing functions for each of these conditions is controlled by a single tank capacitor, the capacitor controlling the operation and release of the B relay, and with both the B and C relays operated causing the release of both relays.

While there has been described what is at present thought to be the preferred embodiment of the invention, it will be understood that modifications may be made therein; and the appended claims are intended to cover all such modification which fall within the true spirit and scope of the invention.

We claim:

1. A line circuit for coupling a key telephone system line to an exchange over a pair of conductors, comprising a line relay responsive to interrupted AC ring signals received from said exchange over said pair for alternately operating and releasing contacts responsive to said ringing signals, a capacitive tank circuit charged during successive operations of said line relay, bistable latching means, said latching means including an operational amplifier having a first and a second input terminal, means for establishing a threshold voltage to said first input terminal, means coupling said second input terminal to said tank circuit, said amplifier responsive to said tank circuit being charged to a predetermined level relative to said threshold for changing from a first stable state to a second stable state, a ring control relay coupled to the output of said amplifier for operation on said change of state of said latching means to forward ring indications to said line, means for maintaining said amplifier in its second state during interruptions between said ring signals comprising a feedback path from the ring control relay to said first amplifier terminal, said capacitive tank circuit responsive after cessation of said ringing signals from said exchange for discharging after a timing interval longer than said interruptions to a level relative to said threshold to restore said bistable latching means to its first stable state, and means responsive to said bistable means reaching its first state for releasing said ring control relay and terminate the forwarding of signals to the key system line.

2. A line circuit as claimed in claim 1, wherein there is a first transistor with its base connected to the output of said amplifier, said transistor biased to limit voltage to the base of a second transistor, said second transistor acting as a driver for said ring control relay, the ring control relay being in the emitter-collector path of said second transistor and said feedback path extending from the emitter-collector path of said second transistor to the first input terminal of said amplifier.

3. A line circuit as claimed in claim 2, wherein there is means responsive to a station on said line going off-hook for closing a grounding conductor to said line circuit to cause the end of forwarding of said ring indication, and means coupling said grounding conductor to said second terminal to vary the level of said second input terminal relative to said threshold to restore said amplifier to its first stable state.

* * * * *